US007865815B2

(12) United States Patent
Albornoz et al.

(10) Patent No.: US 7,865,815 B2
(45) Date of Patent: Jan. 4, 2011

(54) INTEGRATION AND PRESENTATION OF CURRENT AND HISTORIC VERSIONS OF DOCUMENT AND ANNOTATIONS THEREON

(75) Inventors: Jordi Albornoz, Cambridge, MA (US); Brian John Cragun, Rochester, MN (US); Lee David Feigenbaum, Brookline, MA (US); Sean James Martin, Cambridge, MA (US)

(73) Assignee: International Business Machines Corporation, Armonk, NY (US)

(*) Notice: Subject to any disclaimer, the term of this patent is extended or adjusted under 35 U.S.C. 154(b) by 1533 days.

(21) Appl. No.: 11/023,676

(22) Filed: Dec. 28, 2004

(65) Prior Publication Data

US 2006/0143558 A1 Jun. 29, 2006

(51) Int. Cl.
*G06F 17/00* (2006.01)
(52) U.S. Cl. ................................ 715/229; 715/230
(58) Field of Classification Search .................. 715/511, 715/512, 229, 230, 231, 232
See application file for complete search history.

(56) References Cited

U.S. PATENT DOCUMENTS

| 5,537,529 | A  | * | 7/1996 | Borovoy et al. | 715/511 |
| 6,728,760 | B1 | * | 4/2004 | Fairchild et al. | 709/217 |
| 6,918,082 | B1 | * | 7/2005 | Gross et al. | 715/511 |
| 7,028,267 | B1 | * | 4/2006 | Beezer et al. | 715/802 |
| 7,051,275 | B2 | * | 5/2006 | Gupta et al. | 715/512 |
| 2006/0026502 | A1 | * | 2/2006 | Dutta | 715/511 |
| 2006/0107220 | A1 | * | 5/2006 | Letkeman et al. | 715/751 |

OTHER PUBLICATIONS

Sciore, Edward, "Using Annotations to Support Multiple Kinds of Versioning in an Object-Oriented Database System", ACM Transactions on Database Systems (TODS), vol. 16, Issue 3, Sep. 1991, pp. 417-438.*
Rath, Toni M., et al, "Image Retrieval, Users, and Usability: A Search Engine for Historical Manuscript Images" Proceedings of the 27th Annual International ACM SIGIR Conference on Research and Development in Information REtrieval SIGIR '04, Jul. 2004, pp. 369-376.*
Marshall, Catherine C., "Annotation: From Paper Books to the Digital Library", Proceedings of the Second ACM International Conference on Digital Libraries DL '97, Jul. 1997, pp. 131-140.*
U.S. Appl. No. 10/600,014, "Universal Annotation Management System", filed Jun. 20, 2003.
U.S. Appl. No. 10/757,792, "Maintaining Annotations for Distributed and Versioned Files", filed Jan. 15, 2004.

* cited by examiner

*Primary Examiner*—Laurie Ries
(74) *Attorney, Agent, or Firm*—Patterson & Sheridan, LLP

(57) ABSTRACT

A method and system for displaying annotations is provided. The method includes displaying current data to a user through a GUI, displaying at least one of current and historic annotations to a user through the GUI, providing a user selectable link between the historic annotations and historic data associated with the historic annotation, and displaying the historic data to the user through the GUI when the user selectable link is activated by the user.

19 Claims, 4 Drawing Sheets

INTEGRATION AND PRESENTATION OF CURRENT AND HISTORIC VERSIONS OF DOCUMENT AND ANNOTATIONS THEREON

CROSS-REFERENCE TO RELATED APPLICATIONS

The present invention is related to the commonly owned, co-pending U.S. patent applications, U.S. Ser. No. 10/600, 014, filed Jun. 20, 2003, entitled, "Universal Annotation Management System" and U.S. patent application Ser. No. 10/757,792, filed Jan. 15, 2004, entitled "Maintaining Annotations For Distributed And Versioned Files" which are incorporated herein by reference in their entirety.

BACKGROUND OF THE INVENTION

1. Field of the Invention

The present invention generally relates to annotation management, and more particularly, to managing and displaying annotations for multiple versions of data throughout the lifetime of the data.

2. Description of the Related Art

In today's modern computing world, it is possible for a plurality of people to collaborate on a single project without being in the same location at any time during the promulgation of the project. For example, scientists, authors, businessmen, etc. regularly transmit documents between remote peers to obtain their review and comment. Peer review and comment is generally geared toward obtaining the explicit knowledge and input that each of the peers may provide to the work produce that will, in the end, help to generate a better work product. Some well known methods for capturing and storing explicit knowledge that may be obtained from a peer review-type situation includes using a computer system, computer generated databases, word-processor documents, text files, spread-sheets, and many other formats that are commonly used for storing and retrieving data.

Oftentimes, this peer review data is analyzed by various individuals (e.g., experts, technicians, managers, researchers, co-workers, etc.), resulting in rich interpretive information that is often referred to as tacit knowledge. Generally, tacit knowledge is knowledge that is not made explicit. It may be highly personal, is oftentimes very transient, and usually requires joint, shared activities to be transmitted. Examples of tacit knowledge include subjective insights, intuitions, facts learned from conversational exchanges, and hunches. Despite its highly valuable quality, tacit knowledge is often only temporarily captured, for example, as cryptic notes in a lab notebook, discussions, conversations, instant messaging exchanges, e-mails messages, and other transient communications. Thus, because it is typically not captured systematically, tacit knowledge is often lost and does not have an impact on the work product.

One approach used to capture tacit knowledge is to create annotations relating to the explicit data representing the tacit knowledge. Virtually any identifiable type of data appearing in a data source may be annotated, including, but not limited to a matrix of data, such as a spreadsheet or database table, a text document, an image, multi-media data, objects, and/or other forms of data. Further, sub-portions of objects (sub-objects) or sub-portions of data may be annotated, for example, an individual cell, row or column in a database table or a page, section, paragraph or word in a document.

An annotation system generally operates to store descriptive information about objects, or parts of objects, without modifying the objects themselves directly. An annotation store, which is typically a database, stores descriptive information for an annotation, and an indexing scheme generally maps each annotation to the object, or position within the object. An advanced annotation system, such as the one described in a commonly owned, co-pending application entitled "Universal Annotation Management System," which may be found under U.S. patent application Ser. No. 10/600, 382, operates to store annotations separately from the corresponding data object and associates the annotations with an identifier that is location-independent. That is, the identifier does not depend on the location of a data source in a file system hierarchy or existence in a given database. Typically this identifier is derived from the document contents rather than from location artifacts such as filename, path, URL, etc.

Problems arise, however when source documents are changed, as management of the annotations related to the original document becomes an issue as the document changes. If an annotation is made in a document and then the content of the document is moved, changed, or deleted, then several kinds of potential synchronization problems may occur. For example, the content related to the annotation may no longer be present in the document, which leaves the annotation pointing at irrelevant information or no information at all. Alternatively, the annotation may point only to the old position of the text that is now in a new or second position in the document, as a result of changes or modifications to the document, or the words that the annotation points to may have been modified and the annotation may no longer make sense or be valid in view of the modified words. Additionally, the words the annotation refers to may still be correct, but the surrounding text may change the content, and thereby make the comment inaccurate. As an example, in a list of values, a value may be annotated as being the highest value encountered. At a later point in time after a higher value than the original highest value is added to the document, the original annotation will not be accurate, as the annotation was only correct in the context of the original document at its state when the comment was made.

Several algorithms may be used to try to synchronize the documents and associated annotations. For example, one method of dealing with these types of problems is to sidestep the synchronization completely and instead provide a way to manage the cross-references to documents and display of the annotations according to their historical snapshot at the time the annotation was made. Even if algorithms are used to correct annotation positions into a document, the need to see an annotation in its original context is an important capability to understanding an annotation and its applicability to the information.

Accordingly, there remains a need for method for managing annotations that allows for presentation both current and historical annotations, as well as a method for accessing documents related to the historical annotations.

SUMMARY OF THE INVENTION

The present invention generally provides methods, systems, and articles of manufacture providing an annotation system that manages annotations created for different versions of a data source. Annotations created for one version of a data source may be viewed in context from both subsequent and prior versions of the same data source.

Embodiments of the invention further provide an annotation method that includes the capability to display a plurality of annotations to a user viewing a current version of a document. The annotations may include both current and historic annotations. Further, the method of the invention allows the user to select one of the historic annotations, and then the original document or data corresponding to the historic annotation will be displayed for review to the user. The display of the historic document or data may be compared directly to the current document or data in a suitable graphical user interface. Once the user is finished reviewing the historic annotation and the associated document or data, the user may return to annotating the current document or data.

Embodiments of the invention further provide a program product configured to control or manage a computer system or network that implements an annotation system of the invention. The program product may control a word processing program, a spreadsheet program, an image editor, or other program configured to receive annotations. The program product is generally configured to display both current and historic annotations to the user, and further, to allow the user to link to the document or data that was originally associated with the historic annotation, i.e., allow the user to see the document that a previous user saw when making the historic annotation, which helps the current user to put the historic annotation in context in situations where the document text or data has changed.

Embodiments of the invention further provide a method and system for displaying annotations is provided. The method includes displaying current data to a user through a GUI, displaying at least one of current and historic annotations to a user through the GUI, providing a user selectable link between the historic annotations and historic data associated with the historic annotation, and displaying the historic data to the user through the GUI when the user selectable link is activated by the user.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments as illustrated by the appended drawings.

The appended drawings, however, illustrate only typical embodiments of the invention and should not, therefore, be considered limiting of its scope, for the invention may admit to other equally effective embodiments.

DETAILED DESCRIPTION OF THE PREFERRED EMBODIMENTS

Figure 1:
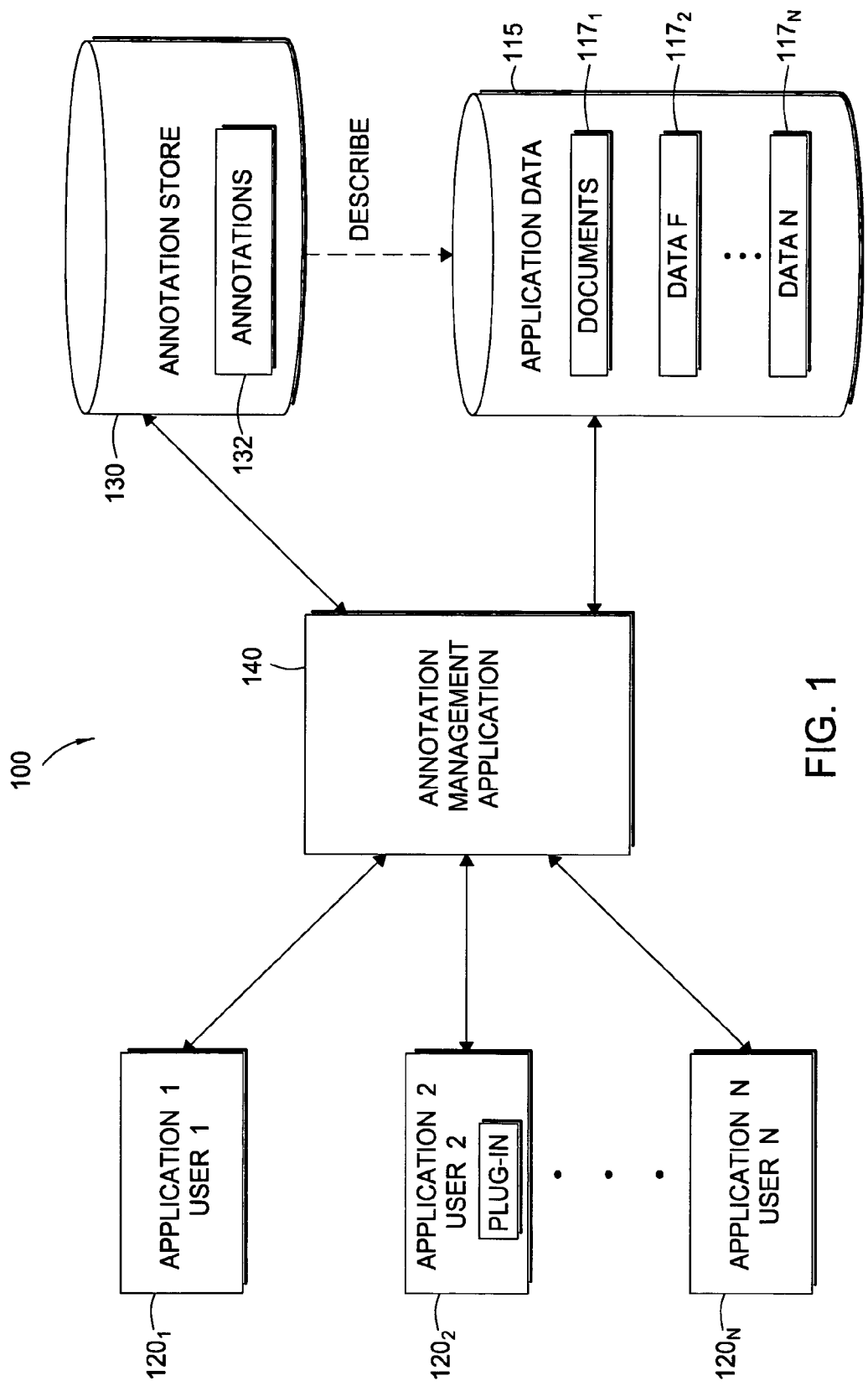
FIG. 1 illustrates an exemplary computing environment that may be used to implement embodiments of the invention.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments, the invention provides advantages over the prior art. However, although embodiments of the invention may achieve advantages over other possible solutions and/or over the prior art, whether or not a particular advantage is achieved by a given embodiment is not intended to be limiting of the invention. Thus, the following aspects, features, embodiments and advantages are intended to be merely illustrative of the invention, and are not intended to be considered elements or limitations of the appended claims, except where explicitly recited in the claims. Likewise, reference to "the invention" is not intended to be construed as a generalization of any inventive subject matter disclosed herein and shall not be considered to be an element or limitation of the appended claims, except where explicitly recited in the claims.

One embodiment of the invention is implemented as a program product for use with a computer system such as, a computer network environment. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Embodiments of the invention generally provide methods, systems, and/or article of manufacture for managing an annotation methodology configured to create, update, and/or maintain annotations for data over a period of time that may include a plurality of revisions to the data and/or annotations. Embodiments of the invention further provide a method, system, and/or article of manufacture configured to allow a user to view multiple stages of annotations and their associated data in a unitary system.

As used herein, the term annotation generally refers to any type of descriptive information associated with data elements in a data source. Annotations may be captured in a variety of forms, including textual annotations (descriptions, revisions, clarifications, comments, instructions, etc.), graphical annotations (pictures, symbols, etc.) or sound recordings. While an annotation may exist in any of these forms, embodiments of the invention may be described below with reference to textual annotations as a particular, but not limiting, example of an annotation. Accordingly, as persons of ordinary skill in the art will understand, the following techniques described with reference to textual annotations made for a document (e.g., a document created using word-processing software) may also be applied to other types of annotations.

As used herein, the term "data source" refers to any type of content containing data object, including without limitation, text documents, database records, database tables, spreadsheets, schematics, images, multi-media, and any other data source used by an application program to create manage, edit, store, view and/or analyze data. To help provide an understanding of the invention, embodiments of the invention are described using a document as a particular type of data source. While the following description may refer to a graphical user interface (GUI), those of ordinary skill in the art will understand that the same functionality may be provided through a non-graphical user interface, such as a command line, and further, that similar information may be exchanged between automated agents (e.g. a software daemon configured to generate annotations) via an automated interface.

Exemplary System

FIG. 1 illustrates an exemplary annotation system 100 including an annotation management application 140, according to one embodiment of the invention. The annotation system 100 may be provided to enterprise users, for example, from a service provider in the business of installing such systems. In an effort to ensure successful deployment of the annotation system 100, the service provider may address both the capture and harvest (retrieval) of tacit knowledge in the form of annotations 132. The capture process generally involves users (e.g., people or, in some cases, application programs) entering annotation content about an item of "target" data. Once captured in the form of an annotation 132, annotations may be stored in an annotation store 130, which may be any sort of memory or data storage medium used in computer or network systems.

A plurality of users may create annotations for a single document or data source by interacting with software that may be embedded within their particular applications (e.g., a plug-in component illustrated for application $120_2$) or alternatively, with a separate annotation application that is external to their application, such as a stand-alone browser or custom application. The annotations 132 created by the individual users may be stored in a central annotation repository, such as annotation store 130. The annotation store 130 is generally configured to be searchable, either independently or in conjunction with the annotated data. Annotations 132 describe various data sources, such as documents $117_1$ generated by User I with the first application $120_1$ (e.g., a word processor), data I $117_2$ manipulated by User II with a second application $120_2$ (e.g., a database application), and $data_N$ $117_N$ generated by User N with an $N^{th}$ application $120_N$ (e.g., a custom application).

Figure 2:
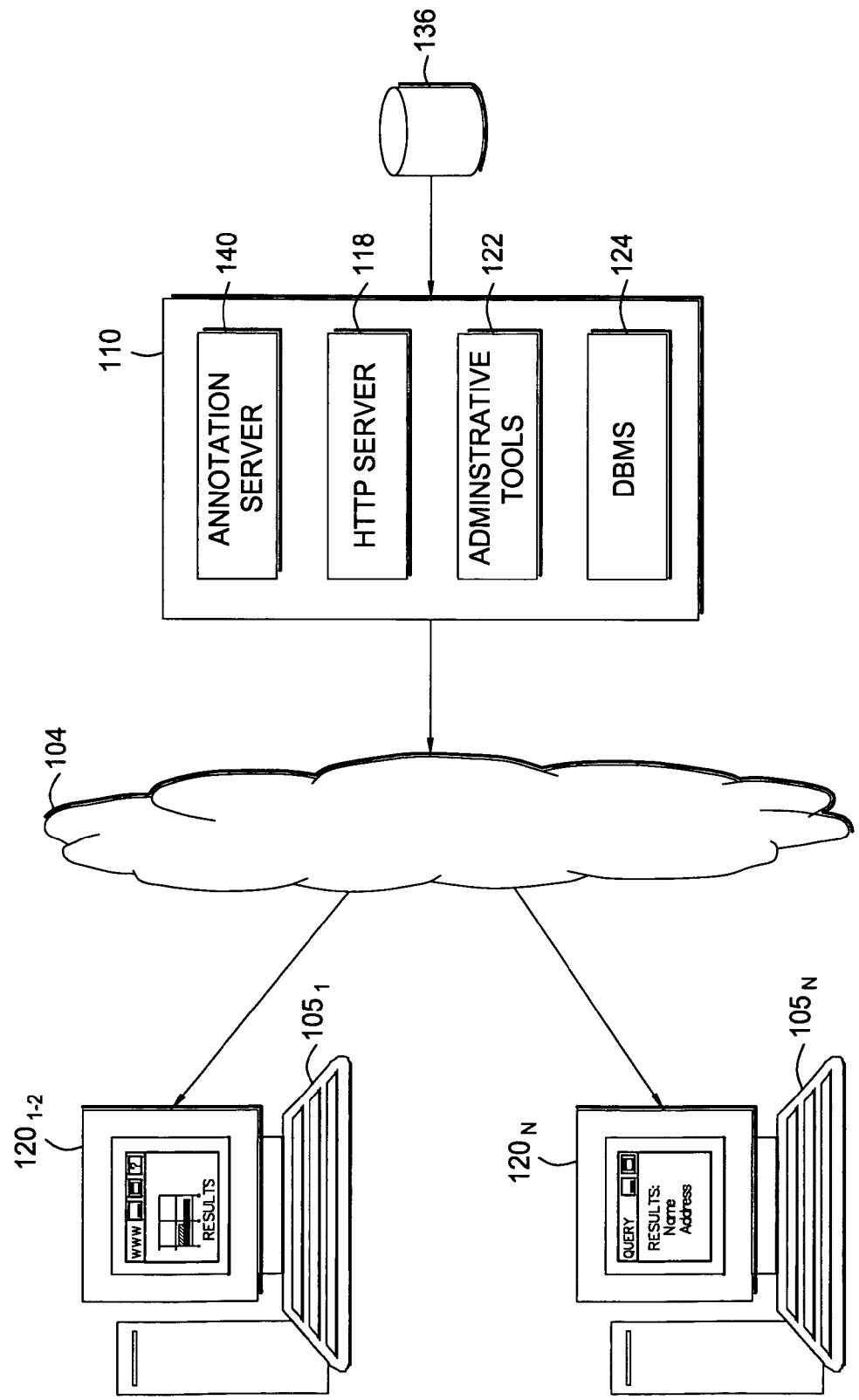
FIG. 2 illustrates a client server view of an exemplary annotation system of the invention.

FIG. 2 illustrates a networked computer system in a client-server configuration. Client computer systems $105_{1-N}$ include a network interface allowing communication with server system 110 over network 104. The network 104 may be a local area network, wherein both the client systems 105 and server system 110 reside in the same general location, or may comprise network connections between geographically distributed systems, including network connections over the Internet, WANs, LANs, etc. Network connections may be established over physical and wireless links using well known communication protocols. Client systems 105 may generally include a central processing unit (CPU) connected via a bus, to memory and at least one storage medium. Client systems 105 are generally running an operating system that is configured to manage the interaction between hardware components and higher-level software applications running on the respective client system 105.

In one embodiment of the invention, a user establishes a network connection between client system 105 and annotation server system 110. Such a connection may include a login process wherein a user authenticates the user's identity to the server system 110 using, for example, a username and password or other authentication schemes (e.g., digital certificates or biometric authentication). Systems that do not require authentication are also contemplated.

The server system 110 may include hardware components similar to those used by client system 105. Accordingly, the server system 110 generally includes a CPU, a memory, and a storage device, coupled one another by at least one bus. The server system 110 is also generally running an operating system that manages the interaction between hardware components and higher-level software applications.

The server system 110 may further include administrative tools 122 and a database management system (DBMS) 124. Each of these components may comprise a software program executing on the server system 110. The DBMS server 124 (or servers) generally comprises a software application configured to manage databases, including the annotation store 130. For some embodiments, the annotation management application 140, and various related components, may be configured via a set of administrative tools 122. For example, the administrative tools 122 may be used to generate a set of annotation configuration files. In one embodiment, the annotation server 140 comprises the software process configured to provide annotation functionally to users interacting with applications 120. The annotation server 140 includes routines to create, identify and store annotations. Additionally, the annotation server 140 may be configured to communicate with HTTP server 118 and DBMS server 124 using well known inter-process communication techniques.

The client/server configuration illustrated in FIG. 2, however, is merely exemplary of one hardware/software configuration that may be used to implement embodiments of the invention, i.e., embodiments of the invention may be implemented using other configurations, regardless of whether the computer systems are complex multi-user computing systems, such as a cluster of individual computers connected by a high-speed network that acts as a single system, single-user workstations, or network appliances lacking non-volatile storage of their own. Additionally, although described herein using a client/server configuration, embodiments employing distributed computing or peer-to-peer networking techniques are contemplated.

In one embodiment of the invention, users interact with the annotation server system 110 using a graphical user interface (GUI). In a particular embodiment, GUI content may comprise HTML documents (i.e., web-pages) rendered on a client computer system $105_1$. In such case, application 120 may comprise a known web-browser. In such an embodiment, the server system 110 includes a Hypertext Transfer Protocol (http) server 118 (e.g., a web server such as the open source Apache web-sever program or IBM's Web Sphere® program) configured to respond to HTTP requests from the client system 105 and to transmit HTML documents to client system 105. The web-pages themselves may be static documents stored on server system 110 or generated dynamically in response to HTTP requests from client system 105. In another embodiment, the GUI may be part of a word processing program, such as Microsoft® Word or Corel's Word Perfect®, for example.

Presentation of Historical Annotation Data

Figure 3:
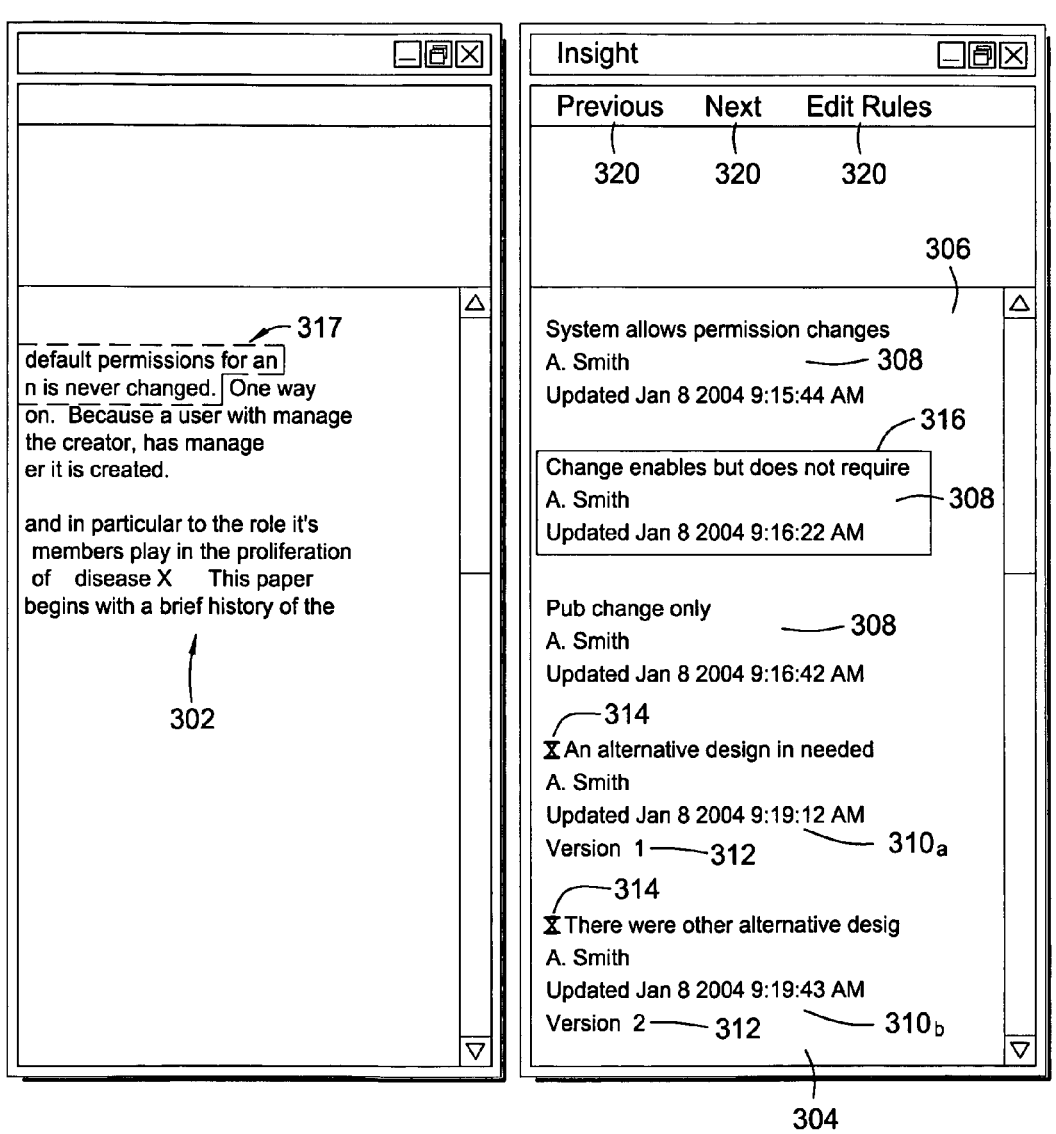
FIG. 3 illustrates a graphical user interface (GUI) that may be used to display embodiments of the invention.

FIG. 3 illustrates an exemplary GUI 300 for a word processing program with associated annotations. GUI 300 includes a data section 302 and an annotation section 304. The data section 302 is configured to display data for annotation (annotated data), and may be a word processing platform, a spreadsheet program, an illustration presenter, an object display program, or any other program or graphical interface configured to display data to a user for review and annotation. For some embodiments, the annotation section 304 may be accessed or invoked from the data section 302, e.g., through a "view annotations" button (not shown). As an alternative, or additionally, annotations may be accessed via icons displayed at or near the annotated data.

The annotation section 304 generally includes a display section 306 where both current and historic annotations are displayed. The annotations that are related to the current document or data displayed in the data section 302 are listed as current annotations 308. Historic annotations are also listed and are indicated as being historic and not directly associated with the current document or data contents. For some embodiments, presentation of historic annotations may be enabled or disabled through, for example, a view historic annotations button.

A current annotation 316, which is shown in an active or highlighted mode in FIG. 3, is the annotation that the user is currently viewing or working with. For example, the user has selected a portion of the text or data 317 in the data section 302, and has created or is viewing an annotation to the data 317 indicating that "change enables but does not require", which as authored by A. Smith. When the annotation is created, the annotation package of the invention may attach several fields to the annotation. As illustrated in FIG. 3, representative fields may include the time and date of the annotation and the author of the annotation, however, the invention is not intended to be limited to these particular fields, as any other field may be associated with the annotation. The annotated data 317 will generally be represented in the data section 302 in a different manner than un-annotated data, i.e., the annotated data 317 may be underlined, as shown in FIG. 3, or alternatively, highlighted or associated with an annotation icon.

Regardless of the representation scheme, the annotated data (historic and/or current) may be illustrated in a manner that indicates to the reader that there is an annotation associated with the data. For some embodiments, an indication (e.g., via a specially designed icon, shading, or the like) that an annotation for a particular annotated section was created for a previous version, which may be useful by allowing a user to quickly identify historical annotated data that may provide particularly interesting information by comparing different document versions. The user may then select the annotated data (or icon) to view the annotations, which will generally be displayed separately from the annotated data itself. When the user selects the annotated data or icon representing that the data has an associated annotation, then a hyperlink may be activated that causes the annotation(s) associated with the selected data to be displayed. For example, as illustrate in FIG. 3, the annotations to the data may be displayed in a separate annotation display window 304.

Alternatively, when the user selects the annotated data and wants to view the annotations, the annotations may be presented in a popup window or overlaying text box directly over or next to the annotated data without opening a separate window. In various embodiments, annotations associated with a document may be identified each time a user accesses a document, or in response to a user request to view annotations. Techniques for managing annotations are illustrated in detail in a commonly owned co-pending application entitled commonly owned, co-pending U.S. patent application, U.S. Ser. No. 10/600,014, filed Jun. 20, 2003, entitled, "Universal Annotation Management System" U.S. incorporated by reference in its entirety to the extent not inconsistent with the present invention.

Annotations that are related to data from a previous document or data source are displayed in the annotation section 304 and are indicated as historic annotations 310. For example, historic annotation 310a was created in relationship to a previous version (Version 1) of the current document or data displayed in the data section 302, and as such, historic annotation 310a has a historic indicator 312 associated therewith. Similarly, historic annotation 310b includes a historic indicator 312. The historic indicators 312 may generally represent the version of the document or data that the annotation was related to.

Embodiments of the invention may also include a user selectable field associated with the historic annotations. The user selectable field may be selected by the user to deactivate or remove the historic annotation associated with the selectable field. This allows the user to remove historic annotations from the annotation list, e.g., when an annotation is no longer applicable to the document or data.

Embodiments of the invention further provide historic annotation data links 314. A data link 314 may be selected by the user to view the version of the document or data for which the historic annotation 310 was created. For example, in the illustration of GUI 300, the user is shown five annotations, where the last two annotations shown are historic annotations 310a, 310b. As such, the historic annotations were applied to a previous version of the document or data displayed in the data section 302. If the user wants to view the document or data that the historic annotation was applied to, then the user may select the historic data link 314, and the historic version of the document or data will be displayed in the data section 302 for review. This invention assumes availability of a system to match a current version of a document with historic versions of the document so that the historic versions may be accessed and viewed in conjunction with the relevant annotations. This might be either a pointer in to a document repository where the historic documents are stored, a naming convention that separates historic documents from current documents, or an integrated document tracking system in communication with the annotation system, as described in U.S. patent application Ser. No. 10/600,014, which is incorporated by reference above.

The annotation section 304 may further include annotation function selections 320. The function selections 320 may be drop down menu items, as illustrated in FIG. 3, and may include functions such as annotation searching, sorting, browsing, and annotation rules that may be selected for the annotation search and display functions. The function selections 320 allow the user to display the list of annotations in various forms and allow for the annotations to be sorted and/or filtered according the date, version, author, or any other field associated with the annotations. The user may use the annotation section 304 and function selections 320 to preview annotations for the current document and previous versions of the document, as illustrated in FIG. 3, without opening the previous documents. The function may also allow a user to select current existing (saved) annotations and apply them to a current version of a document. The function selections 320 allow for implementation of annotation policies, which may then be used to determine which annotations are migrated from one version to another, i.e., which annotations remain applicable to the current version of the document or data. The function selections 320 also allow the user to select an option where the annotation list will indicate whether the annotation is verified for the current version, and how many versions the annotation has been applied to. The utilization of such policies is described in commonly assigned U.S. patent application Ser. No. 10/757,792, entitled "Maintaining Annotations For Distributed And Versioned Files," which is hereby incorporated by reference in its entirety to the extent not inconsistent with the present invention.

The annotations associated with the document or data may be stored either with the document being annotated or external to the document being annotated. In the case in where the annotations are stored with the document being annotated, one embodiment of this invention provides that the annotations may be marked when the text or data associated with the annotation has been changed. For example, when an annotation suggests a change to text and an author makes the change, the invention allows the user to select a field in the annotation section 304 that will mark or indicate that the annotation is no longer applicable to the current stage of the document. Although the annotation may be saved and viewed as a historic annotation, the annotation may not be presented in the annotation section if desired, once the annotation has been addressed, for example.

While annotations may be stored separately in annotation store 130, for some embodiments the annotations may be stored with a document, e.g., embedded in the document or data. Generally, when the documents loads, the annotations are simultaneously loaded. More particularly, as the document loads, the embedded annotations are stripped from the document and assembled in the annotation section 304 for presentation to the user. Similarly, when historic annotations are viewed, the historic document may be opened and the embedded historic annotations may be stripped from the document and presented to the user in a separate annotation section 304.

In another embodiment of the invention, annotations may be stored externally to the document, e.g., in a separate file that is associated with the annotated document or data file. In this embodiment, when a document is changed or modified, a link between the new document and annotations (which may be based on identifiers such as contents hash, GUIDs stored within the document, differing file named, etc.) existing on the original document are generally severed. How this is accomplished depends upon the nature of the link. For example, if the link is based on the contents of the document or data, then no explicit action is generally required, as the changed contents will have implicitly severed the link. If, however, the link is based upon the file name, location, or other document identifier that does not necessarily change with the changing document or data contents, then the invention requires that the system know of the changing document and ensure that either: 1) the document identifier used for annotation linking is changed for the changed document (for example, a new document management system identifier is created); or 2) the annotations currently associated with an unchanging document identifier are marked as no longer applicable.

Embodiments of the invention further include a method for associating versions of a document with one another. For example, the annotation system of the invention may be configured to store links between documents (based on identifiers such as a contents hash, a global unique identifier (GUID) stored within the document, differing file names, etc.) in a relational store. Alternatively, the annotation system may be configured to integrate with a document-version management system that provides similar functionality. In either case, when a document is opened, the annotation system is queried both for annotations on the document being opened and also for annotations on any previous or historic versions of the document. As noted above and illustrated in FIG. 3, the annotations found from the query against previous versions are presented visually differently in the list of all annotations and are generally not marked up in the document.

In another embodiment of the invention, the annotation system may be configured to display annotations or data for comparison. For example, when a user is reviewing a current document and annotating the document, the user may view previous annotations to the document. The user may select a historic annotation and view the historic document that the historic annotation applies to. Further, this embodiment of the invention allows the user to also display the historic document in the GUI at the same time with the current document for comparison purposes. As such, the user may see the historic document and any changes that have been made to the document since the historic version was created. This is a valuable tool for tracking and identifying revisions or progress on a document or data source.

Figure 4:
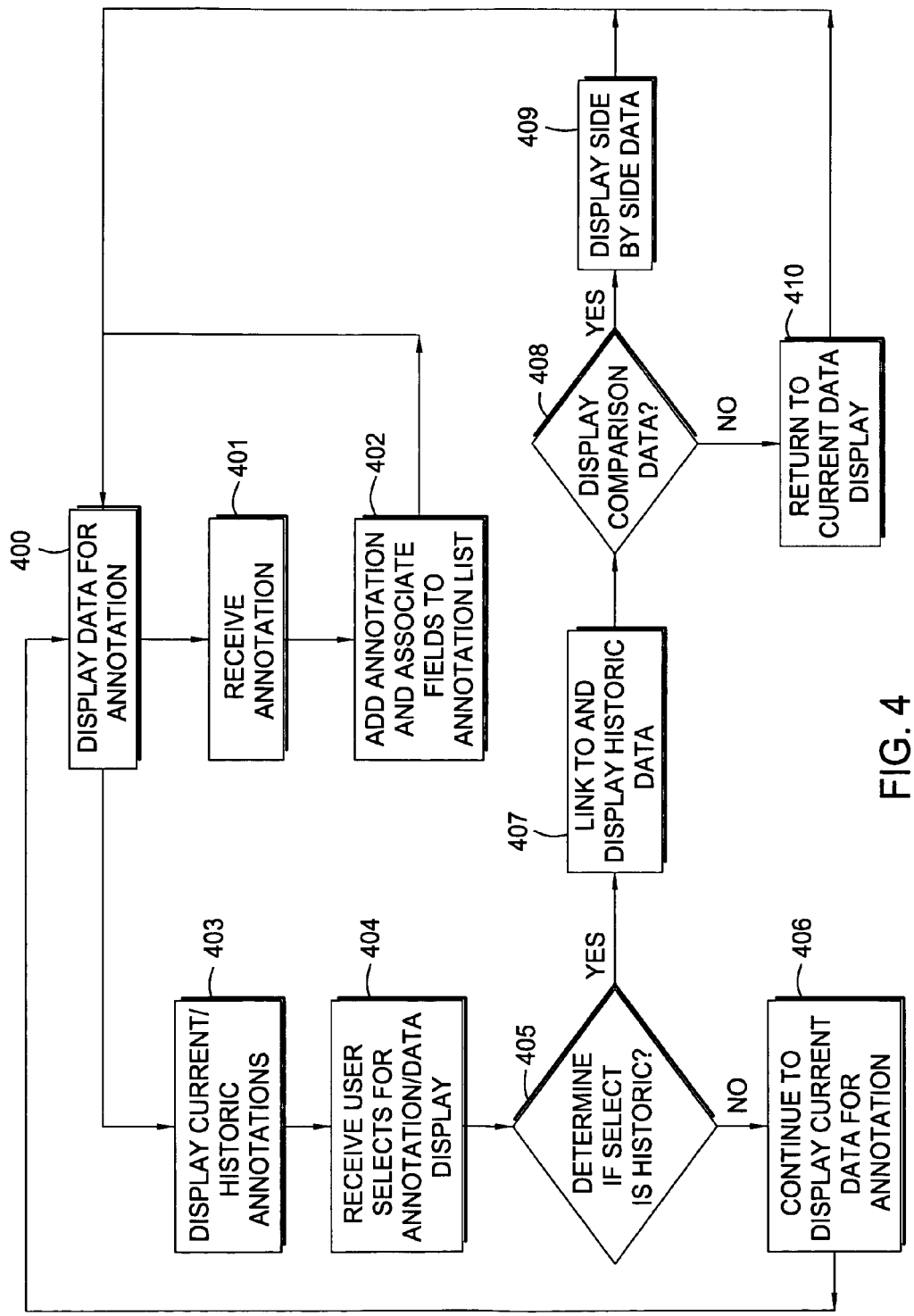
FIG. 4 illustrates an exemplary flowchart of embodiments of the invention.

FIG. 4 illustrates a flowchart of the annotation method of the invention. The annotation method of the invention begins at step 400, where the data and annotation information is displayed in a GUI, such as the GUI illustrated in FIG. 3. At step 401 the data section of the GUI is configured to receive additional annotations from the current user. Annotations may be received from users, such as Users I, II, and III in FIG. 1 in the annotation manager 140. The annotations may be indexed and stored in the annotation store 130, as desires. Any new annotations, along with historic annotations, are displayed to the user in the GUI illustrated in FIG. 3, for example. The new annotations added by the current user are associated with one or more fields and indexed in the annotation list or store. The associated fields are generally used to store, sort, filter, search, etc. the annotations, and may include information such as author, time, date, business title, importance or relevance of the annotation, etc.

At step 403 the GUI of the annotation method displays both current annotations to the document or data, along with historic annotations to the current document and previous versions of the document, as illustrated in annotation section 304 in FIG. 3. The annotation data, as noted above, may be stored separate from the data or document, or alternatively, it may be stored as embedded information in the document or data. At step 404, the user may select one of the annotations and request that the system of the invention display the associated text or data. At step 405, the method of the invention determines if the selected data or text is historic or current. If the data is not historic, i.e., the data is current, then the method continues to step 406, where the GUI continues to display the current data that is associated with the non-historic annotations.

If the annotation is determined to be historic at step 405, then the method of the invention links to a previous version of the document where the historic annotation was made. The historic version of the document associated with the historic annotation is displayed to the user at step 407 for review. For example, the historic version of the document may be displayed in the data section 302 of the GUI illustrated in FIG. 3. Here, the user may review the text of the historic document or data in the form it was presented when the annotation was added by another user, which gives the current user the same context as the historic annotator had at the time the annotation was created.

At step 408, the user is viewing the historic data related to the historic annotation, and the user has the option to compare the historic version of the data to the current version. If comparison is selected by the user, the method of the invention may display the historic version of the data and the current version of the data in the same GUI to the user at step 409. If the user doesn't want to do a data comparison, then the method of the invention may continue to step 410, where the GUI returns to the current document or data display.

While the foregoing is directed to embodiments of the present invention, other and further embodiments of the invention may be devised without departing from the basic scope thereof, and the scope thereof is determined by the claims that follow.

What is claimed is:

1. A method for displaying annotations, comprising:
    displaying current data to a user through a GUI;
    displaying at least one of current and historic annotations to a user through the GUI;
    providing a user selectable link between the historic annotations and historic data associated with the historic annotation; and
    displaying the historic data to the user through the GUI when the user selectable link is activated by the user.

2. The method of claim 1, wherein the historic data comprises a data source for which the historic annotations were generated.

3. The method of claim 1, wherein displaying the historic data further comprises displaying the historic data and the current data simultaneously in the GUI.

4. The method of claim 1, further comprising providing a user selection related to historic annotations, wherein the user selection may be selected by the user to remove historic annotations from the display of historic annotations.

5. The method of claim 1, wherein the historic data comprises one or more previous versions of a data source for which the historic annotations were created.

6. The method of claim 1, further comprising displaying current annotations, historic annotations, and at least one of current data and historic data simultaneously through the GUI.

7. The method of claim 1 further comprising providing a user selectable field, that when selected by the user, operates to sort the current and historic annotations according to a user selected parameter.

8. A computer readable medium containing a program which, when executed, performs an operation, comprising:
    displaying current data to a user through a GUI;
    displaying at least one of a current annotation and a historic annotation to the user through the GUI;
    displaying a user selectable link to the user, wherein the user selectable link is associated with historic data used to generate the historic annotation; and
    displaying the historic data through the GUI when the user selects the user selectable link associated with the historic data.

9. The computer readable medium of claim 8, wherein displaying the historic data further comprises displaying the historic data and the current data simultaneously in the GUI.

10. The computer readable medium of claim 8, further comprising providing a user selection related to historic annotations, wherein the user selection may be selected by the user to remove historic annotations from the display of historic annotations.

11. The computer readable medium of claim 8, wherein the user selectable link comprises a hyperlink to a data storage medium containing the historic data.

12. The computer readable medium of claim 8, further comprising displaying current annotations, historic annotations, and at least one of current data and historic data through the GUI simultaneously.

13. The computer readable medium of claim 8, further comprising a user selectable field, that when selected by the user, operates to sort the current and historic annotations according to a user selected parameter.

14. An annotation system, comprising:
    an annotation store module configured to store annotations;
    an application data module configured to store application data;
    an annotation manager in communication with the annotation store module and the application data module; and
    at least one user interface, wherein the annotation manager is configured to conduct a method comprising:
        receiving annotations related to a current document and store the received annotation in the annotation store;
        displaying current and historic annotations related to the current document and historic documents through the user interface; and
        displaying a user selectable link associated with a historic annotation,
    wherein the user selectable link is hyperlinked to historic data associated with the historic annotation.

15. The system of claim 14, wherein the at least one user interface comprises a computer terminal configured to run a GUI configured to simultaneously display current annotations, historic annotations, and at least one of current data and historic data.

16. The system of claim 14, wherein the method further comprises displaying a user selection related to historic annotations, wherein the user selection may be selected by the user to remove historic annotations from the display of historic annotations.

17. The system of claim 14, further comprising displaying the historic data through the at least one user interface when the user selects the user selectable link associated with the historic annotation.

18. The system of claim 17, further comprising simultaneously displaying the historic data and the current document in a single GUI on the at least one user interface.

19. The system of claim 14, wherein the annotation data comprises multiple versions for which historical annotations were created.

* * * * *